(12) United States Patent
Klement et al.

(10) Patent No.: US 9,230,486 B2
(45) Date of Patent: Jan. 5, 2016

(54) METHOD AND APPARATUS FOR DISPLAYING CONTENT ON A DISPLAY OF AN ELECTRONIC DEVICE DURING DIFFERENT DEVICE OPERATING MODES

(71) Applicant: MOTOROLA MOBILITY LLC, Libertyville, IL (US)

(72) Inventors: Alexander Klement, Palatine, IL (US); Paul N. Baciu, Mundelein, IL (US); Adrian G. Manea, Libertyville, IL (US); Sen Yang, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 77 days.

(21) Appl. No.: 14/078,564

(22) Filed: Nov. 13, 2013

(65) Prior Publication Data

US 2015/0102992 A1    Apr. 16, 2015

Related U.S. Application Data

(60) Provisional application No. 61/889,215, filed on Oct. 10, 2013.

(51) Int. Cl.
*G09G 3/36* (2006.01)
*G09G 3/34* (2006.01)
*G06F 1/32* (2006.01)

(52) U.S. Cl.
CPC ............ *G09G 3/3406* (2013.01); *G06F 1/3228* (2013.01); *G06F 1/3265* (2013.01); *G09G 3/36* (2013.01); *G09G 2320/0233* (2013.01); *G09G 2320/0626* (2013.01); *G09G 2330/023* (2013.01)

(58) Field of Classification Search
CPC ...... G06F 3/048–3/04886; G09G 3/34–3/3426
USPC ............ 345/102, 173–178; 178/18.01–18.09, 178/18.11
See application file for complete search history.

(56) References Cited

U.S. PATENT DOCUMENTS 6,608,614 B1 *   8/2003   Johnson ........................ 345/102
6,900,458 B2     5/2005   Tung et al.
(Continued)

FOREIGN PATENT DOCUMENTS

JP     2003279927 A    10/2003
JP     2006235464 A     9/2006

OTHER PUBLICATIONS

Invitation to Pay Additional Fees from International Application No. PCT/US2014/060116, mailed Feb. 9, 2015 9 pp.

(Continued)

*Primary Examiner* — Stephen Sherman
(74) *Attorney, Agent, or Firm* — Shumaker & Sieffert, P.A.

(57) ABSTRACT

An electronic device utilizes a method for displaying content on a display of the device during different device operating modes. According to one embodiment, the device (e.g., through its processing subsystem) determines whether it is in an active mode or a sleep mode. If the device is in an active mode, the device illuminates a first portion of the display to display content. On the other hand, if the device is in a sleep mode, the device illuminates a second, substantially lesser portion of the display to display content. In one embodiment, the device display includes a display panel and two disparate backlights positioned behind the display panel. The first backlight is operable to illuminate the first portion of the display panel and the second backlight is operable to illuminate the second portion of the display panel when each backlight is respectively activated by the device's processing subsystem.

25 Claims, 6 Drawing Sheets

(56) References Cited

U.S. PATENT DOCUMENTS

| | | |
|---|---|---|
| 8,105,161 B2 | 1/2012 | Rasmussen |
| 8,179,034 B2 | 5/2012 | Potts et al. |
| 8,406,818 B2 | 3/2013 | Roberts et al. |
| 2005/0052446 A1 | 3/2005 | Plut |
| 2006/0001055 A1* | 1/2006 | Ueno et al. ............... 257/257 |
| 2006/0209049 A1 | 9/2006 | Tanaka |
| 2008/0141049 A1 | 6/2008 | Hassan et al. |
| 2010/0225681 A1* | 9/2010 | Yoshida et al. ............ 345/690 |
| 2010/0306693 A1* | 12/2010 | Brinda .......................... 715/784 |
| 2011/0273377 A1 | 11/2011 | Merz |
| 2014/0118272 A1* | 5/2014 | Gunn ........................... 345/173 |

OTHER PUBLICATIONS

International Search Report and Written Opinion of International Application No. PCT/US2014/060116, mailed Apr. 24, 2015 17 pp.

* cited by examiner

METHOD AND APPARATUS FOR DISPLAYING CONTENT ON A DISPLAY OF AN ELECTRONIC DEVICE DURING DIFFERENT DEVICE OPERATING MODES

TECHNICAL FIELD

The present disclosure relates generally to displaying content on a display of an electronic device and, more particularly, to displaying various amounts of content during different device operating modes, while mitigating display-related power consumption.

BACKGROUND

Figure 1:
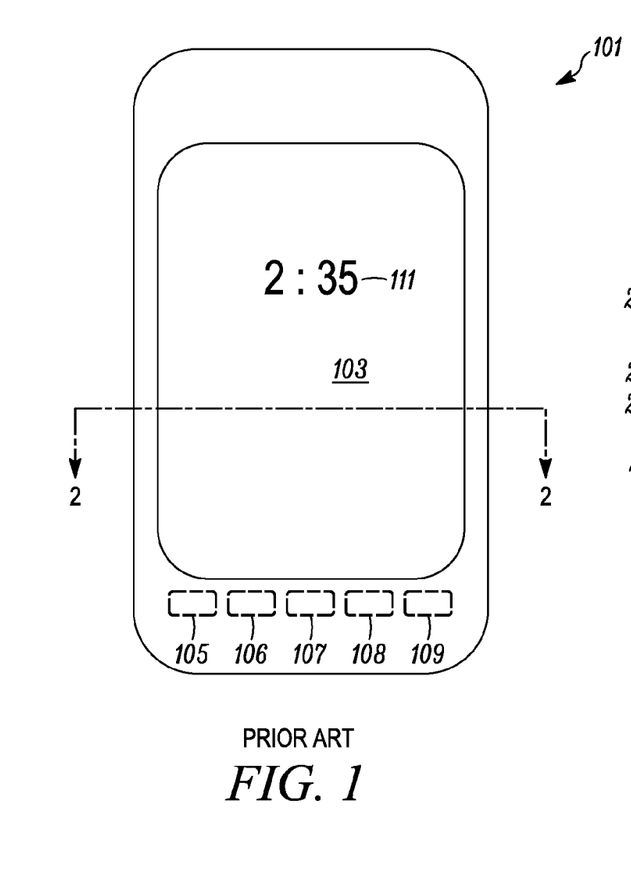
FIG. 1 illustrates a front view of a conventional portable electronic device that includes a liquid crystal display (LCD) with light-emitting diode (LED) backlighting for displaying content on the display.

Many electronic devices, such as smartphones, cellular phones, tablet and laptop computers, multimedia players, and e-book readers, include displays for displaying content to their respective users. Present-day displays are often constructed using liquid crystal display (LCD) panels and a light-emitting diode (LED) backlight. A front view of one such conventional electronic device 101 (e.g., a smartphone) is illustrated in FIG. 1. As illustrated, the electronic device 101 includes, among other things, a display 103 and a plurality of LEDs 105-109 (five shown for illustration) forming part of the display's backlight. When LED backlighting is used, the LEDs 105-109 are typically positioned within the electronic device 101 at one end of the display 103 and, upon being activated by the device's processing unit, illuminate the display 103 to present content 111 generated by the device's graphics processing unit (GPU).

Figure 2:
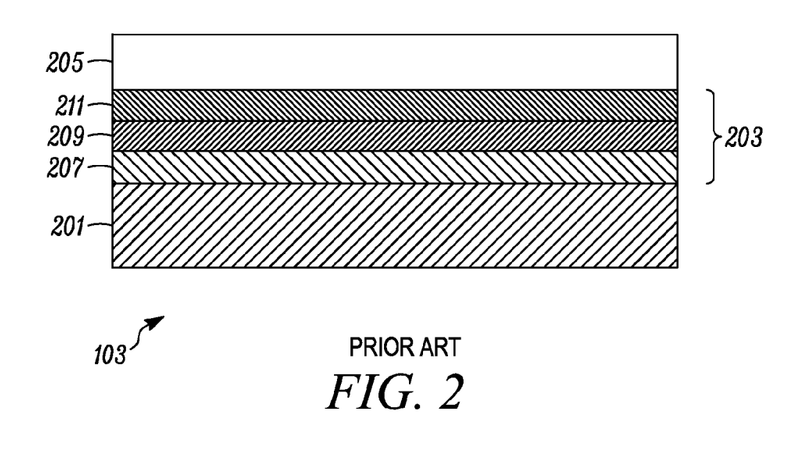
FIG. 2 illustrates an exaggerated cross-sectional view of the display for the electronic device of FIG. 1 along the line 2-2 of FIG. 1.

FIG. 2 illustrates an exaggerated cross-sectional view of the display 103 along the line 2-2 of FIG. 1. As illustrated, the display 103 includes a printed circuit (PC) board 201, an LED backlight 203 positioned upon the PC board 201, and an LCD panel 205 positioned upon the LED backlight 203. The LED backlight 203 typically includes a reflection layer (reflector) 207 deposited on the PC board 201, a diffusion or light guide layer (light diffuser) 209 deposited upon the reflector 207, and a polarization layer (polarizer) 211 deposited upon the light diffuser 209. The LCD panel 205 is positioned upon and adhered to the polarizer 211. The LED backlight 203 also includes the LEDs 105-109 positioned at one end of the display 103 (in this example, the bottom end). When content is to be displayed on the display 103, the electronic device's processing unit activates the LEDs 105-109, which emit light into an end of the light diffuser 209. The emitted light propagates through the light diffuser 209 and is reflected toward the polarizer by the reflector 207. The reflected and diffused light is polarized by the polarizer 211 to illuminate the LCD panel 205. The illuminated LCD panel 205 then displays any content rendered therein by the device's GPU.

Figure 3:
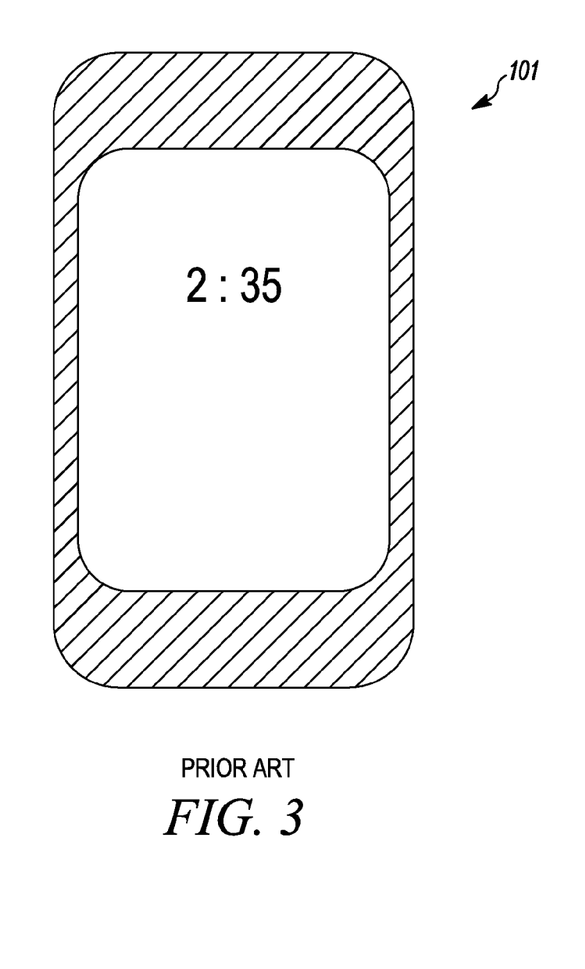
FIG. 3 illustrates a front view of the portable electronic device of FIG. 1 as illuminated by the LED backlighting to display the content.

An exemplary display of digital clock content 111 on the electronic device's display 103 with the LEDs 105-109 illuminated is shown in FIG. 3. When the LEDs 105-109 are activated, they illuminate the entire display 103, even though the only content 111 being displayed is a digital clock positioned about one-quarter of the way down from the top of the display 103. Of course, other content, such as photos, icons, text, notifications, alerts, and other graphics, may be displayed at various locations of the display 103, as so desired. However, regardless of what amount of content is to be displayed, electronic device processing units are typically programmed or otherwise configured to activate all the LEDs 105-109 of an LED backlight 203 when displaying any content on the display 103.

Portable electronic devices that include LED backlit displays obtain power primarily from portable power sources, such as rechargeable batteries. Research has shown that displays, including LED backlit displays, consume a significant portion of a battery's power while they are activated. Thus, activating an LED backlit display to display a small amount of content, such as a digital clock, a small number of icons, a thumbnail photo, a notification, an alert, or any other small image, is an inefficient use of battery power. The desire to display only a small amount of content may arise where the electronic device 101 is configured to keep its display 103 always or almost always on, at least to a minor extent, or is awakened during sleep mode to provide a notification or alert to the device user.

To address the power consumption issue, there has been some discussion in the industry regarding independently controlling the LEDs 105-109 of an LED backlight, instead of activating/deactivating them all at once. However, due to the location of the LEDs 105-109 at one end of the display 103, a substantial portion of the display 103 would still be illuminated, and a significant amount of battery power used, even if only some of the LEDs 105-109 were activated to display a small amount of content. Additionally, turning on some, but not all, of the LEDs 105-109 of an LED backlight to display a small amount of content would produce undesirable artifacts across a substantial portion of the display 103.

Skilled artisans will appreciate that elements in the figures are illustrated for simplicity and clarity and have not necessarily been drawn to scale. For example, the dimensions of some of the elements in the figures may be exaggerated alone or relative to other elements or the elements may be shown in block diagram form to help improve the understanding of the various exemplary embodiments of the present invention.

DETAILED DESCRIPTION

Generally, the present invention encompasses a method and apparatus for displaying content on a display of an electronic device during different device operating modes. According to one embodiment, a processing subsystem or other control function of the electronic device determines whether the device is in an active mode or a sleep mode. When the electronic device in an active mode, the control function of the device causes a first portion of the display to be illuminated to display content. On the other hand, when the electronic device is in a sleep, standby, or other inactive mode, the control function of the device causes a second portion of the display to be illuminated to display content, where the second portion of the display is substantially less than the first portion of the display. For example, the first portion of the display may be the entire display area of the display and the second portion of the display may be a much smaller part of the display area, such as less than about one-half the display area and more preferably less than or equal to about one-quarter (25%) of the display area. In one exemplary embodiment, the second portion of the display is limited to the display area which includes and immediately surrounds the content being displayed.

In an alternative embodiment, the second portion of the display may be based upon the power required to illuminate it instead of by the percentage of display area to be illuminated. For example, the second portion of the display may require substantially less power for illumination than the power necessary to illuminate the first portion of the display. As a result, the second portion of the display may be defined as the display area illuminated through consumption of no more than a predetermined maximum amount of supplied power.

In another alternative embodiment, the electronic system may determine whether the electronic device is in an active mode or a sleep mode by determining whether a user of the electronic device has interacted with one or more controls of the electronic device within a predetermined period of time (e.g., since a prior user interaction with the electronic device). The controls may form part of a user interface of the device or may otherwise permit a user to interact with the device. For example, the controls may include an on/off button, a volume control, a menu/home button, a keypad, a headphone jack, a battery charging connector, a Universal Serial Bus (USB) or other communication port, a touchpad, a touchscreen, or any other device that enables the user to interact with the electronic device. According to this embodiment, if the user has interacted with one or more controls of the electronic device within the predetermined period of time, the electronic device is determined to be in the active mode. By contrast, if the user has not interacted with one or more controls of the electronic device within the predetermined period of time, the electronic device is determined to be in the sleep mode.

According to a further embodiment of the present invention, the electronic device display may include two disparate backlights positioned behind a display panel, such as a liquid crystal display (LCD) panel. A first backlight of the two backlights is configured to illuminate a first portion of the display (e.g., all of a display area of the display panel) when the first backlight is activated, and a second backlight of the two backlights is configured to illuminate a second portion of the display when the second backlight is activated, where the second portion of the display is substantially less than the first portion of the display. In this embodiment, the electronic device may activate the first backlight, but not the second backlight, when the electronic device is in an active mode and may activate the second backlight, but not the first backlight, when the electronic device is in a sleep mode to selectively illuminate the respective portions of the display.

According to yet another embodiment of the present invention, a display for use in an electronic device includes a display panel and two disparate backlights positioned behind the display panel. The first backlight is operable to illuminate a first portion of the display panel when electronically activated by a processing subsystem of the electronic device. The second backlight is operable to illuminate a second, substantially smaller portion of the display panel when electronically activated by the processing subsystem. For example, the first portion of the display panel may be an entire display area of the display panel and the second portion of the display panel may be a much smaller part of the display panel's display area, such as less than about one-half the display area and more preferably less than or equal to about one-quarter (25%) of the display area. In one exemplary embodiment, the second portion of the display panel is limited to the portion of the display panel's display area which includes and immediately surrounds the content being displayed. In another exemplary embodiment, the first backlight is electronically activated when the electronic device's processing subsystem determines that the electronic device is in an active mode, and the second backlight is electronically activated when the processing subsystem determines that the electronic device is in a sleep mode.

According to a further embodiment of the present invention, the display panel may be an LCD panel and the first backlight may include a reflective layer, a light diffuser (e.g., a light guide), and two or more light-emitting diodes (LEDs). The light diffuser is positioned between the reflective layer and the LCD panel. The LEDs are positioned at one or more ends of the light diffuser such that the LEDs emit light into the diffuser when the LEDs are activated. According to yet another embodiment, the second backlight is positioned behind the reflective layer of the first backlight at a location corresponding to the second portion of the display panel. In such an embodiment, the reflective layer of the first backlight is at least partially optically transmissive in a direction from the second backlight to the LCD panel. The transmittance of the reflective layer is such that light emitted from the second backlight passes through the reflective layer and illuminates the second portion of the LCD panel. According to a further embodiment, the second backlight may be positioned between the reflective layer and the light diffuser of the first backlight, instead of being positioned behind the reflective layer. In such an embodiment, the second portion of the display panel may appear slightly duller when the first backlight is active and the second backlight is inactive due to the positioning of the second backlight in front of the reflective layer.

According to yet another embodiment, the display may include a printed circuit (PC) board defining a recess relative to the PC board's top surface. In such a case, the reflective layer may be positioned upon (e.g., adhered to) the top surface of the PC board so as to cover the recess and the second backlight. In one exemplary embodiment, the second backlight is an organic LED (OLED) appropriately sized and shaped to fit within the recess, although other backlight technologies, such as LED, laser, cold cathode fluorescent lamp (CCFL), hot cathode fluorescent lamp (HCFL), external electrode fluorescent lamp (EEFL), or electroluminescent panel (ELP) may be alternatively or additionally employed.

According to yet another alternative embodiment of the present invention, an electronic device includes a display panel, two disparate backlights positioned behind the display panel, and a processing subsystem operably coupled to the two backlights. In this embodiment, the first backlight is operable to illuminate a first portion of the display panel when the first backlight is electronically activated and the second backlight is operable to illuminate a second portion of the display panel when the second backlight is electronically activated, wherein the second portion of the display panel is substantially less than the first portion of the display panel. The processing subsystem is operable in accordance with stored operating instructions to activate the first backlight and deactivate the second backlight to display content on the first portion of the display panel, and to activate the second backlight and deactivate the first backlight to display content on the second portion of the display panel.

According to yet another alternative embodiment, the processing subsystem may be further operable to determine whether the electronic device is in an active mode or a sleep mode. In this case, the processing subsystem may activate the first backlight and deactivate the second backlight to display content on the first portion of the display panel when the processing subsystem determines that the electronic device is in an active mode. On the other hand, the processing subsystem may activate the second backlight and deactivate the first backlight to display content on the second portion of the display panel when the processing subsystem determines that the electronic device is in a sleep mode.

According to a further alternative embodiment, the electronic device may contain a user interface including one or more controls. In such a case, the processing subsystem may be further operable to determine whether the electronic device is in an active mode or a sleep mode by determining whether a user of the electronic device has interacted with one or more of the controls within a predetermined period of time (e.g., since last interacting one or more of the controls or since the device has been powered on). If the user has interacted with the one or more controls within the predetermined period of time, the processing subsystem may determine that the electronic device is in an active mode. Alternatively, if the user has not interacted with one or more of the controls within the predetermined period of time, the processing subsystem may determine that the electronic device is in a sleep mode.

According to a further embodiment of the present invention, the display panel of the electronic device may be an LCD panel and the first backlight may include a reflective layer, a light diffuser (e.g., light guide), and two or more LEDs. In this embodiment, the light diffuser is positioned between the reflective layer and the LCD panel. The LEDs are positioned at one or more ends of the light diffuser such that the LEDs emit light into the diffuser when the LEDs are activated. According to yet another embodiment, the second backlight is positioned behind the reflective layer of the first backlight at a location corresponding to the second portion of the display panel. To accommodate illumination of the display panel by the second backlight in this case, the reflective layer of the first backlight may be at least partially optically transmissive in a direction from the second backlight to the LCD panel. According to a further embodiment, the second backlight may be positioned between the reflective layer and the light diffuser of the first backlight, instead of being positioned behind the reflective layer.

According to yet another embodiment of the present invention, the electronic device may include a PC board defining a recess relative to the PC board's top surface. In such a case, the second backlight may be positioned within the recess and the reflective layer may be positioned upon (e.g., adhered to) the top surface of the PC board so as to cover the recess and the second backlight. In one exemplary embodiment, the second backlight is an organic LED (OLED) appropriately sized and shaped to fit within the recess, although other backlight technologies, such as LED, laser, CCFL, HCFL, EEFL, or ELP may be alternatively or additionally employed.

By configuring a display to facilitate illumination of different-sized portions of it under the control of a processing subsystem, the present invention provides a mechanism for illuminating a small portion of the display during an electronic device's sleep or standby mode (e.g., such as to display a clock, email notification, calendar alert, or other small image), and illuminating a much larger portion of the display (e.g., the entire display) during the electronic device's active mode. As a result, by utilizing embodiments of the present invention, an electronic device's display can be configured to be always on (to at least some degree) without significantly depleting the electronic device's portable power source (e.g., rechargeable battery). Additionally, where a multiple backlight configuration is employed to facilitate the selective illumination of different-sized portions of the display, positioning a secondary backlight into a recess in the PC board or other substrate supporting a primary backlight enables the thickness of the display to remain fixed notwithstanding the addition of the secondary backlight.

Figure 4:
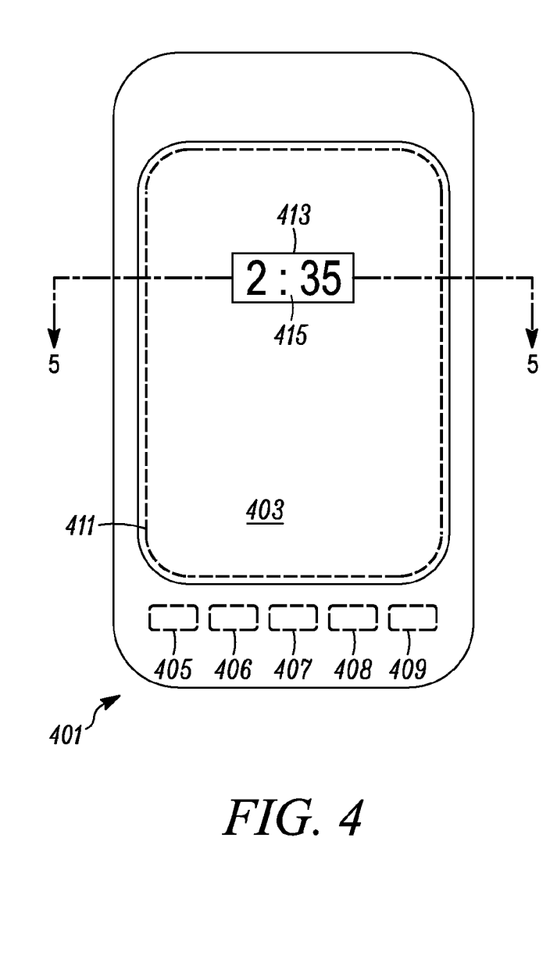
FIG. 4 illustrates a front view of a portable electronic device that contains a display including two disparate backlights for displaying content on the display, in accordance with an exemplary embodiment of the present invention.

Exemplary embodiments of the present invention can be more readily understood with reference to FIGS. 4-10, in which like reference numerals designate like items. FIG. 4 illustrates a front view of an exemplary portable electronic device 401 that contains a display 403 including two or more disparate backlights for displaying content 415 on the display 403. The illustrated portable electronic device 401 is a smartphone, but may alternatively be any electronic device that includes a display and uses a depletable power source, such as a battery. According to this embodiment, the main or primary backlight for the display 403 includes a set of LEDs 405-409 (five shown for illustration) positioned at one end (e.g., a bottom end) of the display 403. The LEDs 405-409 are shown in phantom to indicate they are located inside the portable electronic device 401. The LEDs 405-409 may be alternatively positioned at both ends of the display 403 or otherwise around a periphery of the display 403. When the LEDs 405-409 are activated (e.g., by appropriate drivers under control of the electronic device's processing subsystem), the LEDs 405-409 illuminate a first portion of the display 403. In one embodiment, the first portion is all or substantially all of a display area 411 of the display 403. The primary backlight may be alternatively implemented using lasers or other light sources, such as CCFLs, HCFLs, EEFLs, or an ELP, instead of LEDs 405-409.

Another, or secondary, backlight for the display 403 is configured to illuminate a second, much smaller portion of the display 403. For example, the secondary backlight may be configured to illuminate about twenty-five percent (25%) or less of the display area of the display 403. In the exemplary embodiment illustrated in FIG. 4, the secondary backlight is configured to illuminate a portion 413 of the display 403 that includes and immediately surrounds the content 415 to be displayed. The secondary backlight may be activated by one or more appropriate drivers under control of the electronic device's processing subsystem. The light source for the secondary backlight may include an OLED (active-matrix or passive-matrix), an LED, a CCFL tube, an HCFL tube, an EEFL tube, or an ELP. Where the secondary backlight includes an OLED, the OLED may be formed to fit directly behind the small portion 413 of the display 403, which is intended for illumination when the secondary backlight is activated. As discussed in more detail below, when illumination of the entire display 403 is desired, the primary backlight may be activated; whereas, when illumination of only a small amount of content 415 is desired, the secondary backlight may be activated. Such an arrangement of the display 403 and its control processing enables the primary backlight to be activated when the electronic device 401 is in an active mode (e.g., in current use or having been recently used by a user) and enables the secondary backlight to be activated when the electronic device 401 is in a sleep or non-active mode.

Figure 5:
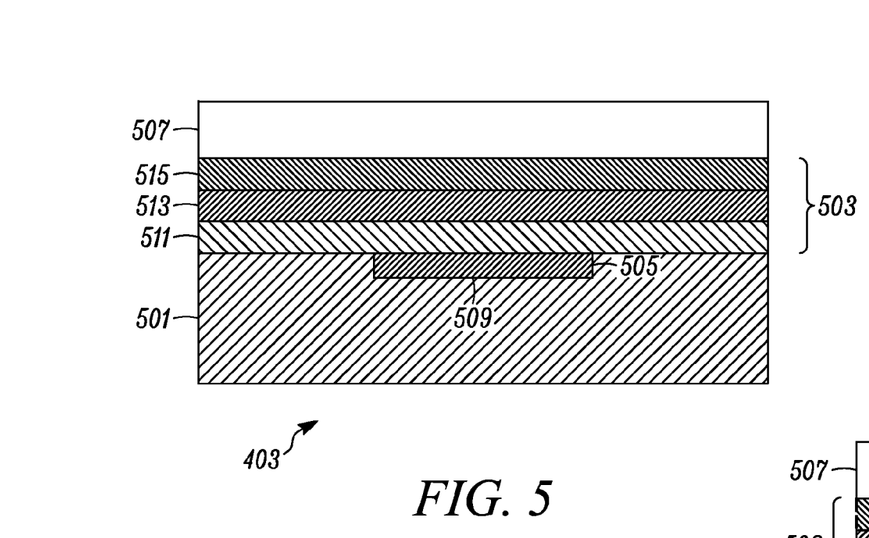
FIG. 5 is an exaggerated cross-sectional view of one exemplary embodiment for the display of FIG. 4 along the line 5-5 of FIG. 4.

FIG. 5 is an exaggerated cross-sectional view of one exemplary embodiment for the display 403 of FIG. 4 along the line 5-5. According to this embodiment, the display 403 includes a substrate 501, a first or primary backlight 503, a secondary backlight 505, and a display panel 507. The substrate 501 has top and bottom surfaces and may be a PC board, a display shield, protection film, or a separation wall. The display panel 507 may be an LCD panel or any panel that uses liquid crystal materials. The two backlights 503, 505 are positioned behind the display panel 507, between the display panel 507 and the substrate 501. In the illustrated embodiment, the secondary backlight 505 is positioned behind the primary backlight 503 in a recess 509 defined relative to the top surface of the substrate 501. By positioning the secondary backlight 505 within a recess 509 of the substrate 501, the secondary backlight 505 may be included without impacting the overall display thickness. Such a configuration may be important in smaller portable electronic devices, such as smartphones, cell phones, cameras, and multimedia devices, with more critical display thickness requirements.

In the embodiment of FIG. 5, the primary backlight 503 includes a reflective layer 511, a light diffuser 513 or other light guide, and an optional polarizer 515. The reflective layer 511 is deposited on or otherwise secured to the top surface of the substrate 501 so as to cover the secondary backlight 505 and the recess 509. For example, the reflective layer 511 may be secured to the substrate 501 using a very thin, optically transparent adhesive. The reflective layer 511, light diffuser 513, and optional polarizer 515 may be conventional LED backlight elements that are well known to those of ordinary skill in the art. According to a more preferable embodiment, the reflective layer 511 may be characterized by a reflectivity of at least ninety-five percent (95%) (measured at an optical wavelength of 550 nanometers) and a transmittance of at least two percent (2%) (more preferably, at least five percent (5%)). With such a construction of the reflective layer 511, light generated by the LEDs 405-409 is predominantly reflected toward the display panel 507 when the primary backlight 503 is activated; whereas, light emanating from the secondary backlight 505 passes through the reflective layer 511 into the light diffuser 513 to illuminate the second portion 413 of the display 403 when the secondary backlight 505 is activated and the primary backlight 503 is deactivated. An exemplary reflector film that may be used as the reflective layer 511 for purposes of constructing the primary backlight 503 is the UX Type Teijin Tetoron Film, which is commercially available from Dupont Teijin Films U.S. Limited Partnership of Chester, Va., U.S.A. In an alternative embodiment, the reflective layer 511 may be specially constructed to have a reflectivity of at least ninety-five percent (95%) (measured at an optical wavelength of 550 nanometers), a transmittance of at least five percent (5%) in a direction from the secondary backlight 505 toward the display panel 507, and a transmittance of not more than two percent (2%) in a direction from the secondary backlight 505 toward the substrate 501.

According to one embodiment, the quantity of light supplied by the secondary backlight 505 is sufficient to illuminate the desired content 415 located within the second portion 413 of the display 403 while producing few, if any, visible artifacts beyond the second portion 413 of the display 403. Alternatively, the quantity of light supplied by the secondary backlight 505 may be sufficient to display content at various portions of the display 403 while substantially reducing display-related power consumption relative to activating the primary backlight 503. For example, the secondary backlight 505 may be secured within a recessed channel fabricated into the substrate 501, which resides behind and follows an outer edge boundary of the display 403 or creates a design on the display 403. Those of ordinary skill in the art will readily appreciate that various other configurations for the secondary backlight 505 may be possible depending on the materials chosen for implementing the secondary backlight 505 (e.g., OLED, LED, laser, CCFL tubing) and the particular portion or portions of the display 403 to be illuminated by the secondary backlight 505. Additionally or alternatively, the secondary backlight 505 may emit white light or one or more colored lights depending on the choice of secondary backlight materials. Where a colored light is created by the secondary backlight 505, the light may be used to change the color of the displayed content 415 (e.g., clock, icon, or other image(s)) as compared to when the content 415 is illuminated by the primary backlight 503.

Figure 6:
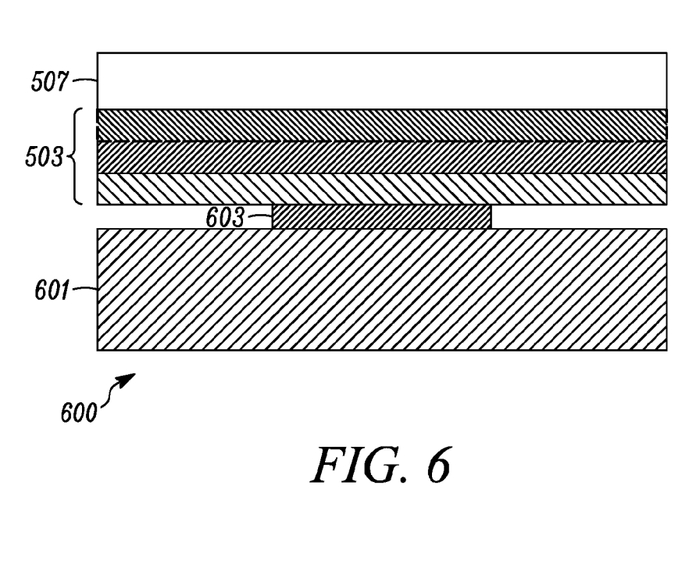
FIG. 6 is an exaggerated cross-sectional view of an alternative exemplary embodiment for the display of FIG. 4 along the line 5-5 of FIG. 4.

In an alternative embodiment, the secondary backlight may be positioned between the substrate and the primary backlight 503, as opposed to being disposed within a recess 509 of the substrate 501. An exaggerated cross-sectional view of such an alternative embodiment for a display 600 is illustrated in FIG. 6. In this case, the thickness of the display 600 would be increased by the thickness of the secondary backlight 603 relative to the thickness of a display without the secondary backlight 603. Additionally, in this embodiment, the substrate 601 would exclude a recess for retaining the secondary backlight 603. The space between the substrate 600 and the primary backlight 503 in areas that exclude the secondary backlight 603 or other disparate backlights may be filled with an optically transparent adhesive epoxy or other applicable material (not shown) as would be understood by those having ordinary skill in the art.

Figure 7:
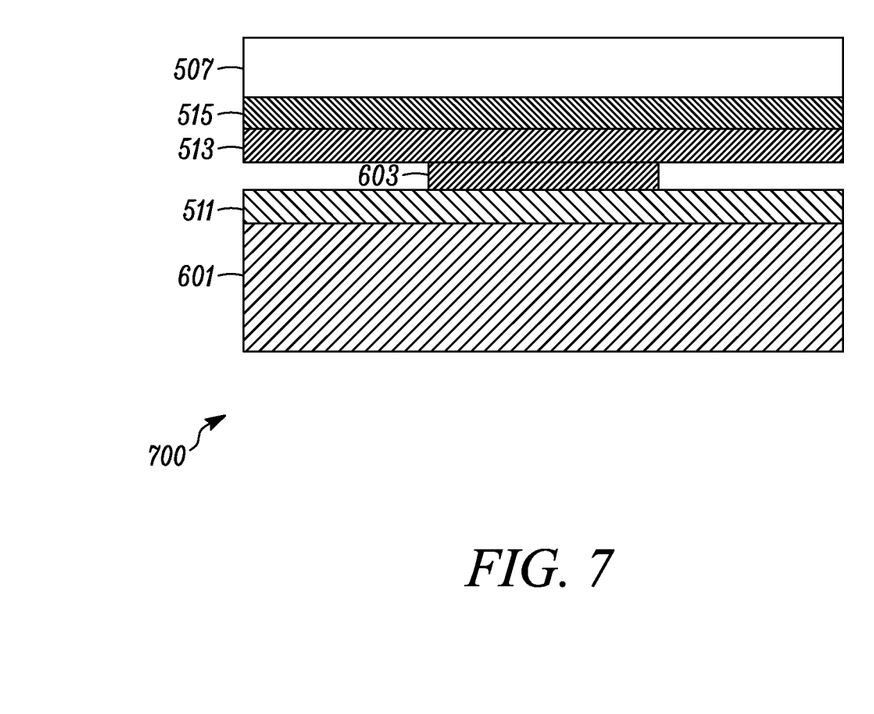
FIG. 7 is an exaggerated cross-sectional view of a further alternative exemplary embodiment for the display of FIG. 4 along the line 5-5 of FIG. 4.

In yet another alternative embodiment, the secondary backlight 603 may be positioned between the reflective layer 511 and the light diffuser 513, as opposed to being positioned behind the reflective layer 511. An exaggerated cross-sectional view of such an alternative embodiment for a display 700 is illustrated in FIG. 7. In this case, the thickness of the display 700 would be increased by the thickness of the secondary backlight 603 relative to the thickness of a display without the secondary backlight 603. Additionally, in this embodiment, the substrate 601 would exclude a recess for retaining the secondary backlight 603. The space between the reflective layer 511 and the light diffuser 513 in areas that exclude the secondary backlight 603 or other disparate backlights may be filled with an optically transparent adhesive epoxy or other applicable material (not shown) as would be understood by those having ordinary skill in the art.

Because the secondary backlight 603 is positioned in front of the primary backlight's reflective layer 511 in this embodiment, the brightness of the light emitted from the secondary backlight 503 may be substantially less than the brightness required when the secondary backlight 503 is positioned behind the primary backlight's reflective layer 511. For example, if the collective transmittance of the light diffuser 513, polarizer 515, and display panel 507 is about 5% and 100 nits of brightness are desired in the second portion of the 413 of the display 403 with the secondary backlight 603 activated and the primary backlight 503 deactivated, the secondary backlight 603 may need to produce about 2000 nits of brightness when positioned in front of the reflective layer 511. If the reflective layer 511 also has 400% gain in the direction of the display panel 507 (e.g., where the reflective layer 511 is fabricated from a multilayered brightness enhancement film, such as the VIKUITI ESR film commercially available from 3M of St. Paul, Minn., U.S.A.), the brightness of the secondary backlight 603 may be reduced to about 500 nits. By contrast, when the secondary backlight 603 is positioned behind the reflective layer 511 and the transmittance of the reflective layer 511 is 5%, the brightness of the secondary backlight 603 would need to be about 40,000 nits where the reflective layer 511 has unity gain or about 10,000 nits where the reflective layer has 400% gain in the direction of the display panel 507.

Figure 8:
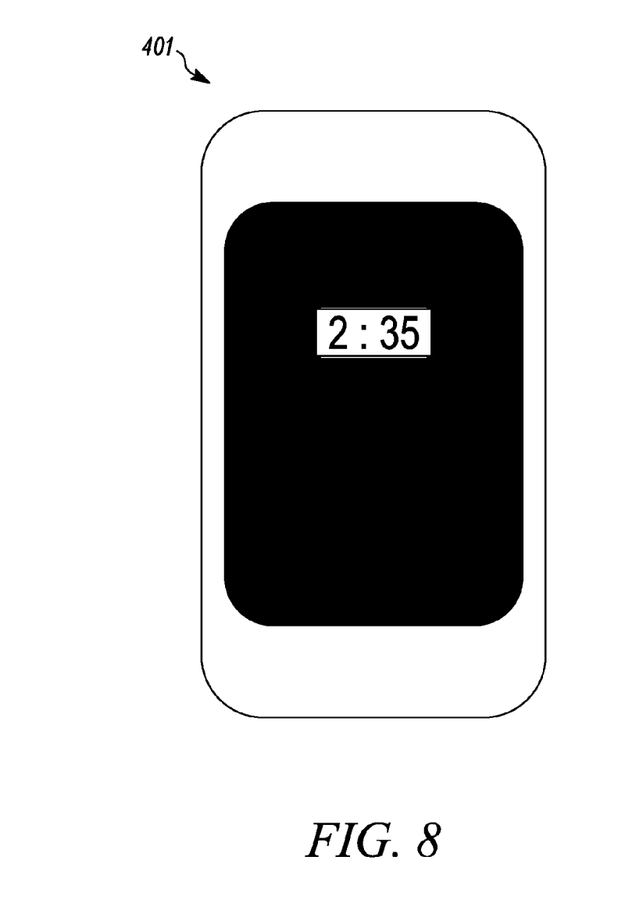
FIG. 8 is a front view of the portable electronic device of FIG. 4 as illuminated by one of the backlights to display content in a small portion of the display's display area, in accordance with an exemplary embodiment of the present invention.

FIG. 8 is a front view of the portable electronic device 401 of FIG. 4 as illuminated by the secondary backlight 505, 603 to display the content 415 in a small portion 413 of the display's display area 411. According to this exemplary embodiment of the present invention, when the secondary backlight 505, 603 is electronically activated (e.g., by a processing subsystem of the electronic device 401) and the primary backlight 503 is deactivated, the secondary backlight 505, 603 illuminates only the area 413 immediately surrounding the content 415 to be displayed, as opposed to illuminating most or all of the display area 411 as would be the case if the primary backlight 503 was activated. Thus, when activated, the secondary backlight 505, 603 illuminates a substantially smaller amount of the display 403 or display panel 507 than does the primary backlight 503.

Figure 9:
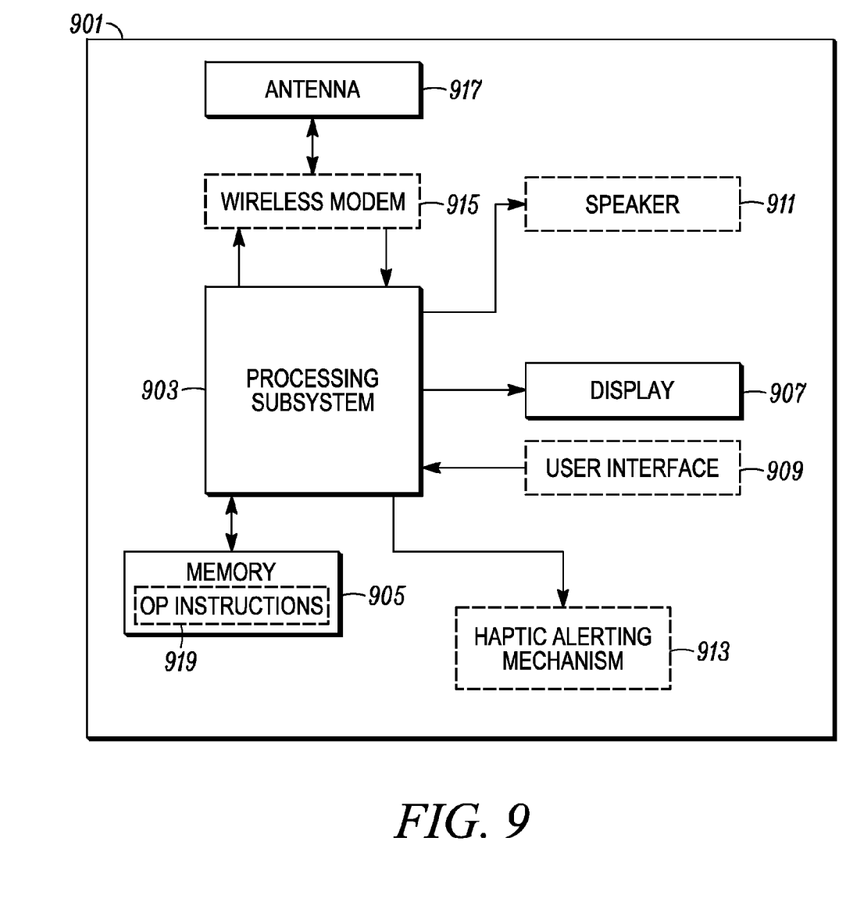
FIG. 9 is an electrical block diagram of an electronic device operable to display content during different device operating modes by illuminating different-sized portions of a display based on a current device operating mode, in accordance with another exemplary embodiment of the present invention.

FIG. 9 is an electrical block diagram of an electronic device 901 operable to display content during different device operating modes by illuminating different-sized portions of a display 907 based on a current device operating mode, in accordance with another exemplary embodiment of the present invention. The electronic device 901 may be any electronic device that includes a display. For example, but not by way of limitation, the electronic device 801 may be a portable electronic device, such as a smartphone, a cellular phone, a tablet computer, a portable multimedia device, a personal digital assistant, a portable electronic reading device, a laptop computer, a digital camera, a camcorder, a portable biometric measurement device, a portable or handheld gaming device, or any other portable electronic device.

According to the exemplary embodiment of FIG. 9, the electronic device 901 includes, inter alia, a processing subsystem 903, memory 905, and a display 907. The device 901 may optionally include various other elements, including a user interface 909, a speaker 911, a haptic alerting mechanism 913 (e.g., a vibratory alert), and a wireless modem 915 and antenna arrangement 917 (e.g., where the device 901 is capable of wireless communications).

The processing subsystem 903 may include one or more microprocessors, one or more microcontrollers, one or more digital signal processors (DSPs), one or more digital signal controllers, a graphics processing unit (GPU), one or more state machines, logic circuitry, or any other device or combination of devices that processes information based on operating or programming instructions 919 stored in memory 905 accessible by the processing subsystem 903. One of ordinary skill in the art will appreciate that the processing subsystem 903 can be implemented using multiple processors as may be required to handle the processing requirements of the present invention and the various other included functions of the electronic device 901. One of ordinary skill in the art will further recognize that when the processing subsystem 903 has one or more of its functions performed by a state machine or logic circuitry, the memory containing the corresponding operating instructions 919 can be embedded within the state machine or logic circuitry as opposed to being external to the processing subsystem 903, as is the electronic device memory 905 illustrated in FIG. 9.

The memory 905 may store a variety of information to facilitate operation of the electronic device 901, including operating instructions 919 (e.g., software or computer programs) for execution by the processing subsystem 903 to implement features of the present invention. The memory 905 may be separate from the processing subsystem 903 as depicted in FIG. 9 or may be integrated into the processing subsystem 903 as discussed above. The memory 905 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory 805 and that the device memory 805 may include one or more individual memory elements.

The display 907 may be any conventional or future-developed display. In one exemplary embodiment, the display 907 may be implemented using the display 403, 600, 700 described above with respect to FIG. 5, FIG. 6, or FIG. 7. In such a case, the display 907 may include a display panel 507 and two or more disparate backlights 503, 505. The display panel 507 may be an LCD panel or any panel using liquid crystal materials. Alternatively, the display 907 may be an LED display, an OLED display, a plasma display, or any other display that uses a backlight. The display 907 may further include or be coupled to appropriate conventional drivers, and may optionally include a GPU for illuminating various picture elements (e.g., pixels) of the display 907 as instructed by the processing subsystem 903. Alternatively, the GPU may be separate from the display 907 (e.g., in an integrated circuit (IC) that is separate from the IC containing the display drivers), or be integrated into the processing subsystem 903 as discussed above. The display 907 may further include touch sensors so as to form a touchscreen display and thereby incorporate at least part of the user interface 909.

Where the display 907 includes two or more backlights 503, 505, the electronic device 901 may be configured such that the processing subsystem 903 is operably coupled (e.g., through controlled switches and other circuitry) to the backlights 503, 505 and controls each backlight 503, 505 independently. As a result, the processing subsystem 903 may activate the primary backlight 503 and deactivate the secondary backlight or backlights 505, 603, or activate one more of the secondary backlights 505, 603 and deactivate the primary backlight 503. As described in more detail below, the decision of whether to activate the primary backlight 503 or one or more of the secondary backlights 505, 603 may be based on the current operating mode for the electronic device 901. Alternatively, the decision of whether to activate the primary backlight 503 or one or more of the secondary backlights 505, 603 may be based on other criteria, such as amount of remaining battery power (for a portable electronic device), receipt of a new message or notification (e.g., email, text message, meeting alert, calendar alert, voice mail, alarm (e.g., from alarm clock application)), or output from a proximity sensor incorporated into the electronic device 901 (e.g., where the sensor indicates that a user's finger or hand is in close proximity to the electronic device 901).

When included, the user interface 909 may be any conventional user interface or combination of conventional user interface components. For example, the user interface 909 may include rocker keys, buttons, a keypad, a keyboard, a scroll wheel, a thumbwheel, one or more microphones and associated speech conversion/processing software, one or more speakers, a touchpad, a touchscreen incorporated into the display 907, and/or any other now-known or future-developed user interface technology. Thus, the user interface 909 may include various touch, voice, and/or other controls with which a user may interact during use of the electronic device 901.

The speaker 911, when included, may be a conventional speaker or audio transducer sized, shaped, and positioned to accommodate operation of the particular electronic device 901. The speaker 911 may also form part of the user interface 809 as discussed above. The haptic alerting mechanism 913, when included, may be a conventional vibration system (e.g., an electrically driven motor connected to an unbalanced weight) that is also sized, shaped, and positioned to accommodate operation of the particular electronic device 901.

The wireless modem 915 and antenna system 917 may be included where the electronic device 901 is capable of wireless communications. The wireless modem 917 is generally used herein to refer to the modems and transceivers used to provide all wireless communication functionality for the electronic device 901. Thus, as used herein, the wireless modem 915 may include one or more wide area wireless modems (e.g., such as are used to access cellular or satellite communications systems) and/or one or more short-range wireless modems (e.g., such as are used to access short-range communication networks, including Wi-Fi, Bluetooth, Zigbee, and other short-range networks). The antenna system 917 may be active or passive and accommodates the wireless communication functionalities of the wireless modem 915, as is known in the art.

Figure 10:
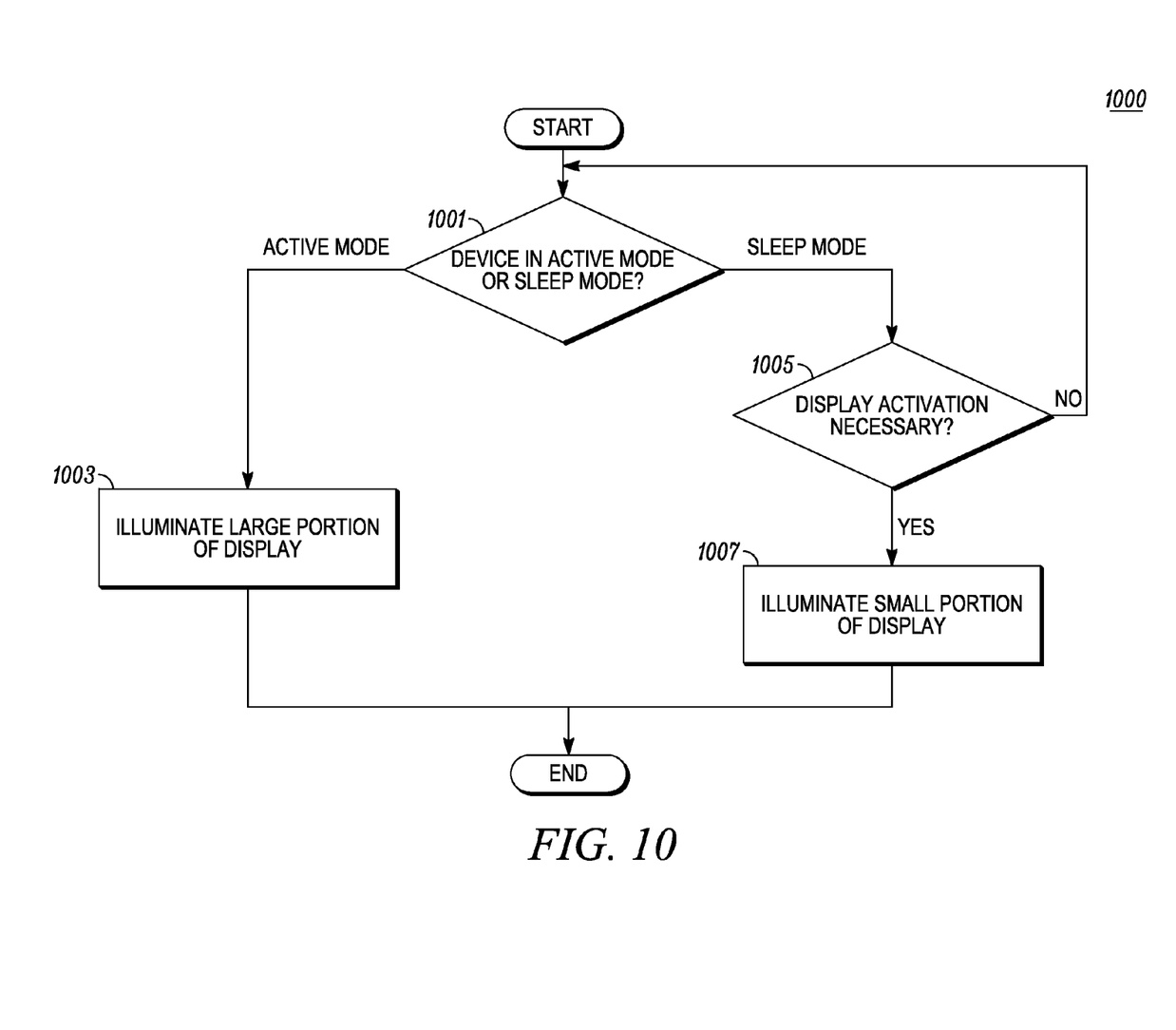
FIG. 10 is a logic flow diagram of steps executed by an electronic device to illuminate different portions of the device's display based on the device's operating mode, in accordance with a further exemplary embodiment of the present invention.

Operation of the electronic device 901 in accordance one or more exemplary embodiments of the present invention may be further understood with reference to FIGS. 4-5 and 9-10. Referring to FIG. 10, a logic flow diagram 1000 is depicted illustrating steps executed by the electronic device 901 to display content on the display 907. The logic flow steps may be executed by various components of the electronic device 901, including, but not limited to, the processing subsystem 903, (and its constituent hardware and/or software modules), the memory 905, the display 907, and the user interface 909. The steps executed by the processing subsystem 903 are preferably performed in accordance with the operating instructions 919 stored in the memory 905. For purposes of the following illustrative description of electronic device operation, reference will be primarily made to a portable electronic device embodiment as illustrated in FIGS. 4 and 9.

According to the logic flow of FIG. 10, the electronic device 901 determines (1001) whether the device 901 is currently in an active mode or a sleep mode. Such a determination may be made by the processing subsystem 903 based on whether a user has interacted with one or more controls of the device 901 or its user interface 909 within a predetermined period of time. For example, the processing subsystem 903 may determine that the electronic device 901 is in an active mode where the processing subsystem 903 has detected signals from the user interface 909 within the predetermined time period, which may be a default or user-defined time period. The predetermined time period may be commenced when the processing subsystem 903 is initially turned on or awakened from sleep mode as a result of user interaction with the user interface 909 or other controls of the device 901. Alternatively, the processing subsystem 903 may determine that the electronic device is in sleep mode where the processing subsystem 903 has not detected signals from the user interface 909 within the predetermined time period. In other words, sleep mode may correspond to the device's mode of operation upon expiration of an inactivity timer.

When the electronic device 901 is determined to be in an active mode, the device 901 illuminates (1003) a large portion of the display 907 to allow content to be viewed by a user. For example, where the display 907 is a display 403 as illustrated in FIGS. 4 and 5, the processing subsystem 903 may electronically activate the primary backlight 503, but not the secondary backlight 505, to illuminate all or substantially all of the display area 411 of the display 403 and/or its display panel 507. According to one embodiment, the processing subsystem 903 causes at least seventy-five percent (75%) of the display area 411 of the display 403 to be illuminated when the electronic device 901 is determined to be in an active mode. Where the primary backlight 503 is LED-based, the processing subsystem 903 may activate the LEDs 405-409 to activate the primary backlight 503.

On the other hand, when the electronic device 901 is determined to be in sleep mode, the device 901 may optionally determine (1005) whether activation of the display 907 is necessary. For example, the operating instructions 919 for the processing subsystem 903 may provide that the display 907 is to remain off or deactivated during sleep mode or that some amount of content (e.g., a small amount of content, such as a clock, an icon, a text notification, an email notification, a calendar alert, an alarm, and so forth) may be continuously or intermittently displayed on the display 907 during sleep mode. Where the operating instructions 919 permit intermittent activation of the display 907 to display content 415 during sleep mode based on one or more trigger events, such as receipt of text or email messages, the electronic device's processing subsystem 903 may determine that display activation is necessary upon occurrence of each trigger event. Where the operating instructions 919 provide for the processing subsystem 903 to display content 415 continuously during sleep mode (as well as optionally in response to trigger events), the processing subsystem 903 may determine that activation of the display 907 is necessary based upon entry of the device 901 into sleep mode.

When activation of the display 907 is necessary during sleep mode, the electronic device 901 illuminates (1007) a small portion of the display 907 to display the applicable content. The portion of the display 907 that is illuminated during sleep mode is substantially less that the portion of the display 907 illuminated during the device's active mode. According to one embodiment, the device 901 illuminates no more than about twenty-five percent (25%) of a display area of the display 907 to display content during sleep mode. For example, where the display 907 is a display 403 as illustrated in FIGS. 4 and 5, the processing subsystem 903 may electronically activate a secondary backlight 505, but not the primary backlight 503, to illuminate the smaller portion 413 of the display area 411 of the display 403 and/or its display panel 507. As illustrated in FIGS. 4 and 8, the portion 413 of the display 403 illuminated during sleep mode may be the portion that is immediately beneath the content 415 to be displayed or that immediately surrounds it. Illuminating only a small portion of the display 907 during sleep mode (e.g., by activating a secondary backlight 505 while deactivating the primary backlight 503) reduces power consumption and extends battery life as compared to illuminating all or substantially all of the display 907 (e.g., by activating the primary backlight 503) when sleep mode display is required.

The present invention encompasses a method and apparatus for displaying content on a display of an electronic device during different device operating modes. With this invention, the electronic device may illuminate only that portion of the display which is absolutely necessary to display particular content when the device is in a sleep mode, and may alternatively illuminate all or substantially all of the display when the device is in an active mode. By selectively illuminating the display in such a manner, the device can conserve power and extend battery life. To facilitate selective illumination of the device display according to one embodiment, the display may incorporate two or more disparate backlights, where each backlight is separately controllable by the device's processing subsystem. One backlight may be a primary backlight which illuminates all or substantially all of the display when activated, and the other backlight or backlights may be secondary backlights, which each illuminate a substantially smaller portion of the display than does the primary backlight. For example, the primary backlight may be activated to illuminate all or substantially all of the display during the device's active mode and a secondary backlight may be activated to illuminate a particular portion of the display during the device's sleep mode. The use of multiple disparate and independently controllable backlights in a single display is a further improvement over conventional display technology.

As detailed above, embodiments of the present invention reside primarily in combinations of method steps and/or apparatus components related to displaying content on a display of an electronic device, such as during different device operating modes. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Additionally, while FIG. 10 illustrates one exemplary order for implementing process steps of the present invention, those skilled in the art will recognize and appreciate that the order of steps which are not dependent upon other steps may be changed as desired without departing from the spirit and scope of the present invention.

In this document, relational terms such as "first" and "second," "top" and "bottom," and the like may be used solely to distinguish one element or action from another element or action without necessarily requiring or implying any actual relationship or order between such elements or actions. The terms "comprises," "comprising," "includes," "including," "has," "having," "contains," "containing," and any other variations thereof are intended to cover a non-exclusive inclusion, such that a process, method, device, article, or apparatus that comprises, includes, has, or contains a list of elements does not include only those elements but may include other elements not expressly listed or inherent to such process, method, device, article, or apparatus. The term "plurality of" as used in connection with any element or action means two or more of such element or action. A claim element proceeded by the article "a" or "an" does not, without more constraints, preclude the existence of additional identical elements in the process, method, device, article, or apparatus that includes the element.

It will be appreciated that embodiments of the electronic device 401, 901 described herein may be comprised of one or more conventional processors and unique stored program instructions that control the processor(s) to implement, in conjunction with certain non-processor circuits, some, most, or all of the functions of the electronic device 401, 901 and its operational methods as described herein. The non-processor circuits may include, but are not limited to, storage devices (such as memory 905), the display 403, 600, 700, 907, the user interface 909, the haptic alerting mechanism 913, modems 915, antenna systems 917, and hardware portions of the processing subsystem 903, as well as filters, clock circuits, and various other non-processor circuits. As such, the functions of the processor and non-processor circuits may be collectively interpreted as steps of a method for displaying content on a display of an electronic device. Alternatively, some or all functions could be implemented by a state machine that has no stored program instructions, or in one or more application specific integrated circuits (ASICs), in which each function or some combinations of functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating software instructions or programs and/or integrated circuits to implement the process disclosed herein without undue experimentation.

In the foregoing specification, specific embodiments of the present invention have been described. However, one of ordinary skill in the art will appreciate that various modifications and changes can be made without departing from the scope of the present invention as set forth in the appended claims. For example, while the foregoing description focuses on the use of two disparate and separately controllable backlights for illuminating different portions of a display, those of ordinary skill in the art will readily recognize and appreciate that more than two backlights may be alternatively used and that the quantity and types of backlights used may be varied according to the illumination and power consumption limitations of the particular circumstances. Additionally, while FIG. 4 illustrates the positioning of LEDs 405-409 at only the bottom end of the display 403 to form part of the primary backlight 503, those of ordinary skill in the art will readily recognize and appreciate that the LEDs 405-409 may be located at the top end of the display 403, along the left and right sides of the display 403, and/or at multiple locations about a periphery of the display 403 so long as the LEDs are arranged to mitigate any undesired lighting effects (e.g., destructive interference) and to emit their light outputs into the light diffuser 513 of the display 403. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims and all equivalents of those claims as issued.

What is claimed is:

1. A method comprising:
   determining whether an electronic device is in an active mode or a sleep mode;
   illuminating, by a first backlight of a display of the electronic device, when the first backlight is activated, a first portion of the display to display content when the electronic device is in the active mode; and illuminating, by a second backlight of the display, when the second backlight is activated, a second portion of the display to display the content when the electronic device is in the sleep mode, wherein the second backlight is distinct from the first backlight, wherein the second portion of the display is substantially less than the first portion of the display, and wherein the first portion of the display includes at least part of the second portion of the display.

2. The method of claim 1, wherein determining whether the electronic device is in the active mode or the sleep mode comprises:

determining whether a user of the electronic device has interacted with one or more controls of the electronic device within a predetermined period of time;

if the user has interacted with the one or more controls of the electronic device within the predetermined period of time, determining that the electronic device is in the active mode; and if the user has not interacted with the one or more controls of the electronic device within the predetermined period of time, determining that the electronic device is in the sleep mode.

3. The method of claim 1, wherein the first portion of the display is substantially all of a display area of the display.

4. The method of claim 1, wherein the second portion of the display is less than or equal to about 25% of a display area of the display.

5. The method of claim 1, wherein the second portion of the display is limited to a portion of the display which immediately surrounds the content being displayed.

6. The method of claim 1, wherein the first backlight and the second backlight are each positioned behind a liquid crystal display (LCD) panel, and wherein the first portion of the display includes substantially all of a display area of the LCD panel, and wherein the illuminating of the first and second portions of the display comprises:

activating the first backlight, but not the second backlight, when the electronic device is in the active mode; and
activating the second backlight, but not the first backlight, when the electronic device is in the sleep mode.

7. The method of claim 6, wherein the second portion of the display is limited to a portion of the display which includes and immediately surrounds the content being displayed.

8. A display comprising:
a display panel;
a first backlight positioned behind the display panel and being operable to illuminate a first portion of the display panel when electronically activated by a processing subsystem of an electronic device; and
a second backlight positioned behind the display panel and being operable to illuminate a second portion of the display panel when electronically activated by the processing subsystem of the electronic device, wherein the second backlight is distinct from the first backlight, wherein the second portion of the display panel is substantially less than the first portion of the display panel, and wherein the first portion of the display panel includes at least part of the second portion of the display panel.

9. The display of claim 8, wherein the first portion of the display panel is substantially all of a display area of the display panel.

10. The display of claim 8, wherein the second portion of the display panel is less than or equal to about 25% of a display area of the display panel.

11. The display of claim 8, wherein the second portion of the display panel is limited to a portion of a display area of the display panel which includes and immediately surrounds content being displayed.

12. The display of claim 8, wherein the second backlight includes an organic light emitting diode.

13. The display of claim 8, wherein the display panel is a liquid crystal display (LCD) panel and wherein the first backlight comprises:
a reflective layer;
a light diffuser positioned between the reflective layer and the LCD display panel; and
a plurality of light-emitting diodes (LEDs) positioned at one or more ends of the light diffuser such that the plurality of LEDs emit light into the diffuser when the plurality of LEDs are activated.

14. The display of claim 13, wherein the second backlight is positioned behind the reflective layer at a location corresponding to the second portion of the display panel, and wherein the reflective layer is at least partially optically transmissive in a direction from the second backlight to the display panel.

15. The display of claim 13, further comprising:
a substrate including a top surface and a bottom surface, and defining a recess relative to the top surface, wherein the second backlight is positioned within the recess and the reflective layer is positioned upon the top surface of the substrate so as to cover the recess and the second backlight.

16. The display of claim 13, wherein the second backlight is positioned between the reflective layer and the light diffuser at a location corresponding to the second portion of the display panel.

17. An electronic device, comprising:
a display panel;
a first backlight positioned behind the display panel and being operable to illuminate a first portion of the display panel when electronically activated;
a second backlight positioned behind the display panel and being operable to illuminate a second portion of the display panel when electronically activated, wherein the second backlight is distinct from the first backlight, wherein the second portion of the display panel is substantially less than the first portion of the display panel, and wherein the first portion of the display panel includes at least part of the second portion of the display panel; and
a processing subsystem operably coupled to the first backlight and the second backlight, the processing subsystem operable in accordance with stored operating instructions to:
activate the first backlight and deactivate the second backlight to display content on the first portion of the display panel; and
activate the second backlight and deactivate the first backlight to display the content on the second portion of the display panel.

18. The electronic device of claim 17, wherein the processing subsystem is further operable in accordance with the stored operating instructions to:
determine whether the electronic device is in an active mode or a sleep mode;
activate the first backlight, but not the second backlight, when the electronic device is in an active mode; and activate the second backlight, but not the first backlight, when the electronic device is in a sleep mode.

19. The electronic device of claim 18, further comprising:
a user interface including one or more controls,
wherein the processing subsystem is operable to determine whether the electronic device is in the active mode or the sleep mode by:
   determining whether a user of the electronic device has interacted with the one or more controls within a predetermined period of time;
   if the user has interacted with the one or more controls device within the predetermined period of time, determining that the electronic device is in the active mode; and
   if the user has not interacted with the one or more controls within the predetermined period of time, determining that the electronic device is in the sleep mode.

20. The electronic device of claim 17, wherein the second portion of the display panel is less than or equal to about 25% of a display area of the display panel.

21. The electronic device of claim 20, wherein the second portion of the display panel is limited to a portion of the display area of the display panel which includes and immediately surrounds the content being displayed.

22. The electronic device of claim 17, wherein the display panel is a liquid crystal display (LCD) panel, and wherein the first backlight comprises:
a reflective layer;
a light diffuser positioned between the reflective layer and the LCD display panel; and
a plurality of light-emitting diodes (LEDs) positioned at one or more ends of the light diffuser such that the plurality of LEDs emit light into the diffuser when the plurality of LEDs are activated.

23. The electronic device of claim 22, wherein the second backlight is positioned behind the reflective layer at a location corresponding to the second portion of the display panel, and wherein the reflective layer is at least partially optically transmissive in a direction from the second backlight to the display panel.

24. The electronic device of claim 23, further comprising:
a substrate including a top surface and a bottom surface, and defining a recess relative to the top surface, wherein the second backlight is positioned within the recess and the reflective layer is positioned upon the top surface of the substrate so as to cover the recess and the second backlight.

25. The electronic device of claim 22, wherein the second backlight is positioned between the reflective layer and the light diffuser at a location corresponding to the second portion of the display panel.

* * * * *